US008224338B2

(12) United States Patent
Puthenpura et al.

(10) Patent No.: US 8,224,338 B2
(45) Date of Patent: Jul. 17, 2012

(54) METHOD AND APPARATUS FOR JOINT OPTIMIZATION OF DEDICATED AND RADIO ACCESS NETWORKS

(75) Inventors: Sarat Puthenpura, Berkeley Heights, NJ (US); David G. Belanger, Hillsborough, NJ (US); Arun Jotshi, Lake Hiawatha, NJ (US); Sam Parker, Cranbury, NJ (US); Ravi Raina, North Brunswick, NJ (US); Wenjie Zhao, Princeton, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 757 days.

(21) Appl. No.: 12/291,281

(22) Filed: Nov. 7, 2008

(65) Prior Publication Data

US 2010/0120440 A1    May 13, 2010

(51) Int. Cl.
*H04W 40/00* (2009.01)
(52) U.S. Cl. ...................................................... 455/446
(58) Field of Classification Search .................. 455/446
See application file for complete search history.

(56) References Cited

U.S. PATENT DOCUMENTS

| 7,639,988 | B2* | 12/2009 | Abusch-Magder et al. ................. 455/67.11 |
| 2003/0017836 | A1* | 1/2003 | Vishwanathan et al. ...... 455/517 |
| 2004/0214577 | A1* | 10/2004 | Borst et al. .................... 455/446 |
| 2005/0073962 | A1* | 4/2005 | Zabele et al. ................. 370/254 |
| 2005/0233750 | A1* | 10/2005 | Pirrone ......................... 455/446 |
| 2007/0022093 | A1* | 1/2007 | Wyatt et al. ....................... 707/2 |
| 2008/0021915 | A1* | 1/2008 | Bakalash et al. ............. 707/101 |
| 2008/0186873 | A1* | 8/2008 | Pujet et al. .................... 370/254 |
| 2010/0056163 | A1* | 3/2010 | Schmidt et al. ............... 455/446 |

* cited by examiner

*Primary Examiner* — Nathan Mitchell
(74) *Attorney, Agent, or Firm* — Turocy & Watson, LLP (57) ABSTRACT

A computerized method and system for integrated access network business planning for a telecommunications carrier. The invention enables a user to input a set of network business planning parameters that are utilized by a linear programming model to jointly optimize a carrier's dedicated and radio access network by executing a plurality of network optimization models and determine network configuration changes for the dedicated and radio access networks as a constrained optimization based on the set of business planning parameters.

20 Claims, 11 Drawing Sheets

METHOD AND APPARATUS FOR JOINT OPTIMIZATION OF DEDICATED AND RADIO ACCESS NETWORKS

FIELD OF THE INVENTION

The present invention relates generally to telecommunications, and more particularly, to systems and methods for enabling a carrier to jointly optimize dedicated and radio access networks.

BACKGROUND OF THE INVENTION

A telecommunications network is comprised of a network of telecommunications links and nodes. Examples of telecommunications networks include a computer network, the Internet and the Public Switched Telephone Network. Telecommunications network links, including nodes, may in turn be built out of hierarchical transmission systems which transmit signals from one place to another. These may be communicated as electrical, optical or radio signals.

Telecommunications networks typically comprise core networks and access networks. A core network is the central part of a telecommunications network that provides various services to customers who are connected by the access network. Core networks provide the services of traffic aggregation, user authentication, connection/control switching (routing), billing, service invocation, access to gateways to gain access to other networks, hosting the user/subscriber database and core network operations/maintenance. An example of a core network is the Network Switching Subsystem (NSS) in the Global System for Global communication (GSM) relating to mobile communication, which supports cell phones, PDAs, mobile automotive platforms and the like.

An access network refers to the portion of a communications network which connects users/subscribers to their immediate service provider. The access network may also include feeder plant or distribution network(s), and drop plant or edge network(s). Access networks may be subdivided to include a dedicated access network comprising wires, cables and equipment physically connecting a user to the core network, and a radio access network. A radio access network is generally considered to be part of a mobile telecommunications network. It implements a radio access technology, and it resides between the mobile device(s) and the core network. It is possible for a single mobile device to be simultaneously connected to multiple radio access networks. Devices capable of this are sometimes called dual-mode devices. In this embodiment, the mobile device can support both GSM and Universal Mobile Telecommunications System (UMTS), also known as "3G" or third generation radio access technologies, making it possible to seamlessly transfer between different RANs without the user noticing any disruption in service.

Access networks represent a critical part of telecommunications carrier's network infrastructure. Decisions affecting design, deployment and installation directly dictate operation, upgrade and maintenance costs, and therefore play a key role in a carrier's overall profitability. Since carriers frequently have both dedicated and radio access networks as part of their overall service offerings, it would be desirable to optimize these in a manner that takes advantages of the synergies between them. While emphasis has been directed to optimal access network topology design and ongoing adjustment and tuning to maximize profitability, access networks are typically optimized independently in today's networking environment.

When considering access networks individually, the synergies between the networks may not be a significant consideration, yielding a less than optimal overall deployment of resources, particularly the applicability to use a common network whenever possible. Current methods to optimize access network deployment involve manual analysis in examining and comparing the outputs from various optimization models and they do not holistically consider the problem taking into account any synergies between the dedicated and radio access networks. Business plans are frequently established based on ad-hoc parameters or assumptions, and not applied uniformly in a manner that provides systematic enforcement in consistency among various business programs. It therefore becomes difficult for a carrier to do any extensive "what-if" scenario analysis, thereby resulting in reduced access network savings, sub-optimal resource allocation and profitability.

In view of the above, it would therefore be desirable to develop a methodology and system for enabling integrated access network business planning that takes the output from all optimization models and jointly determines the overall optimal network resource deployment to ensure consistency between networks, minimize resource requirements and achieve maximum profitability for a given set of business planning parameters including, but not limited to, overall capital spending, overall operation resource, throughput limits, planning horizon, etc. It would also be desirable to enable a carrier to examine different scenarios of various access network options to ultimately reduce access costs by jointly optimizing the overall system. To the inventors' knowledge, no such system or method currently exists.

SUMMARY OF THE INVENTION

In accordance with a first aspect of the present invention, a computerized method is provided for integrated access network business planning for a telecommunications carrier. The method generally comprises the steps of: receiving a set of network business planning parameters; executing a plurality of network optimization models, the models including dedicated and radio access networks; and jointly determining network configuration changes for the dedicated and radio access networks based on the set of business planning parameters.

In accordance with a second aspect of the present invention, there is provided a system adapted for integrated access network business planning for a telecommunications carrier, including a server programmed to: receive a set of network business planning parameters; execute a plurality of network optimization models, the models including dedicated and radio access networks; and jointly determine network configuration changes for the dedicated and radio access networks based on the set of business planning parameters.

The system includes an on-line analytical processing program (OLAP) for enabling a user to input network business planning scenarios through a graphical user interface.

The process of determining proposed network configuration changes utilizes indices of access circuits, optimization models, bundle groups, time periods, access vendors, circuit types, and migration types. The network configuration changes are determined as a constrained optimization that maximizes cost savings and minimizes resource requirements for any given network planning scenario.

A graphical user interface can display the network configuration changes that are determined in accordance with the above on a network topology display.

These aspects of the invention and further advantages thereof will become apparent to those skilled in the art as the present invention is described with particular reference to the accompanying drawings.

DETAILED DESCRIPTION OF THE INVENTION

Embodiments of the invention will be described with reference to the accompanying drawing figures wherein like numbers represent like elements throughout. Before embodiments of the invention are explained in detail, it is to be understood that the invention is not limited in its application to the details of the examples set forth in the following description or illustrated in the figures. The invention is capable of other embodiments and of being practiced or carried out in a variety of applications and in various ways. Also, it is to be understood that the phraseology and terminology used herein is for the purpose of description and should not be regarded as limiting. The use of "including," "comprising," or "having" and variations thereof herein are meant to encompass the items listed thereafter and equivalents thereof as well as additional items.

The terms "mounted," "connected," and "coupled," are used broadly and encompass both direct and indirect mounting, connecting, and coupling. Further, "connected," and "coupled" are not restricted to physical or mechanical connections or couplings.

The invention is not limited to any particular software language described or implied in the figures. A variety of alternative software languages may be used for implementation of the invention. Some components and items are illustrated and described as if they were hardware elements, as is common practice within the art. However, various components in the method and apparatus may be implemented in software or hardware such as FPGAs, ASICs and processors.

Figure 1:
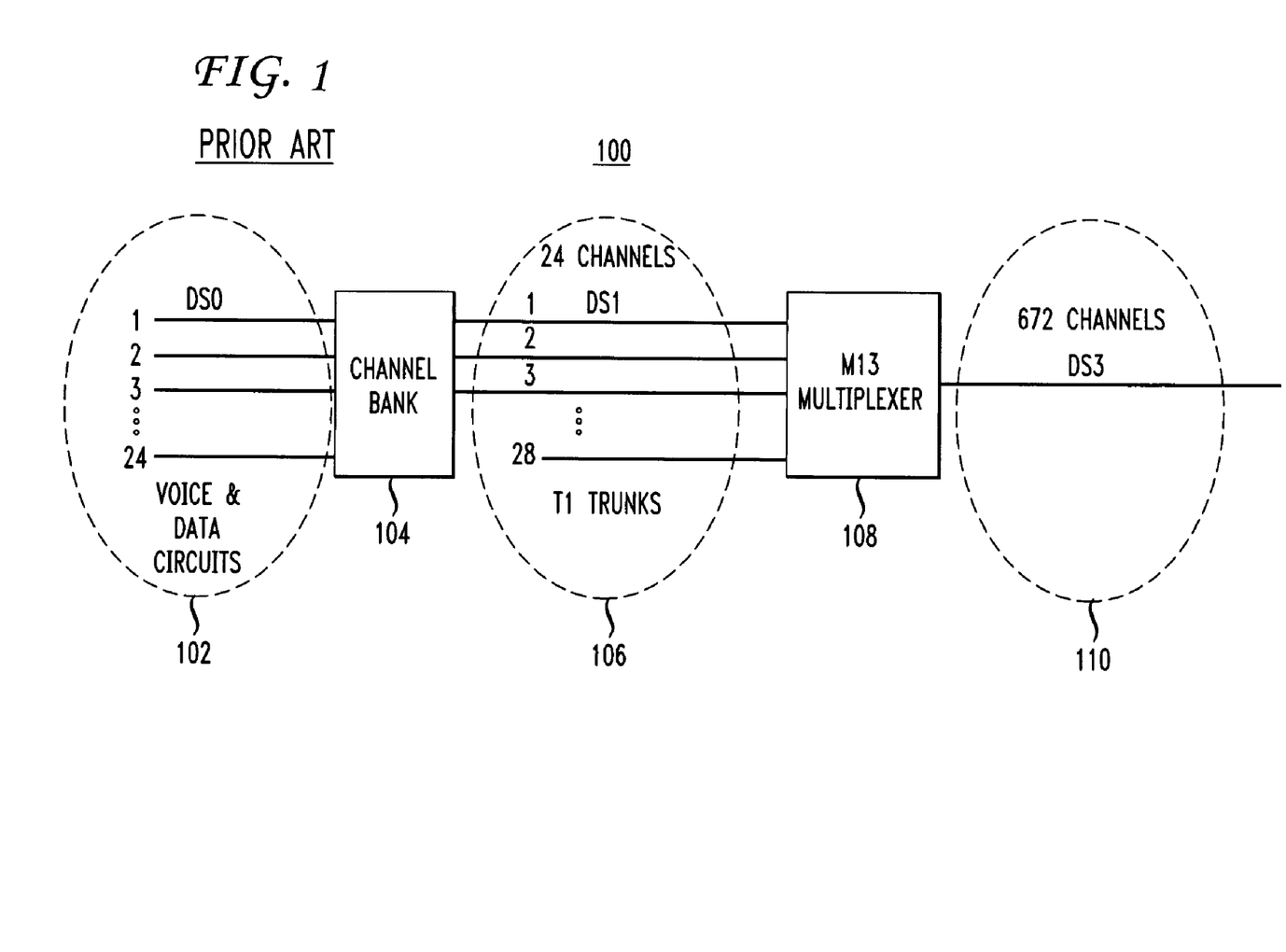
FIG. 1 is a schematic diagram of a digital circuit hierarchy for access network traffic aggregation.

FIG. 1 is a schematic diagram 100 of access network traffic aggregation in a sample telecommunication network. Voice and data circuits 102 utilizing the base unit of the T-carrier technology, a Digital Signal 0 (DS0) unit, with a data rate of 64 Kbits/second, are aggregated by a channel bank 104. As is well known in the art, the channel bank 104 is operable to perform multiplexing or demultiplexing on a group of communications channels, such as digital telephone lines, into one channel of higher bandwidth or higher digital bit rate. In this example, 24 DS0 voice and data circuits 102 are multiplexed into a single Digital Signal 1 (DS1) output signal. DS1 signals have a data rate of 1.544 Mbits/second. Up to 28 DS1 (or T1) trunks 106 containing the aggregated channels are multiplexed by an M13 Multiplexer (or similar) 108 into a single DS3 output signal 110, capable of a data rate of 44.736 Mbits/second, equivalent to transporting 672 individual voice and data channels.

Figure 2:
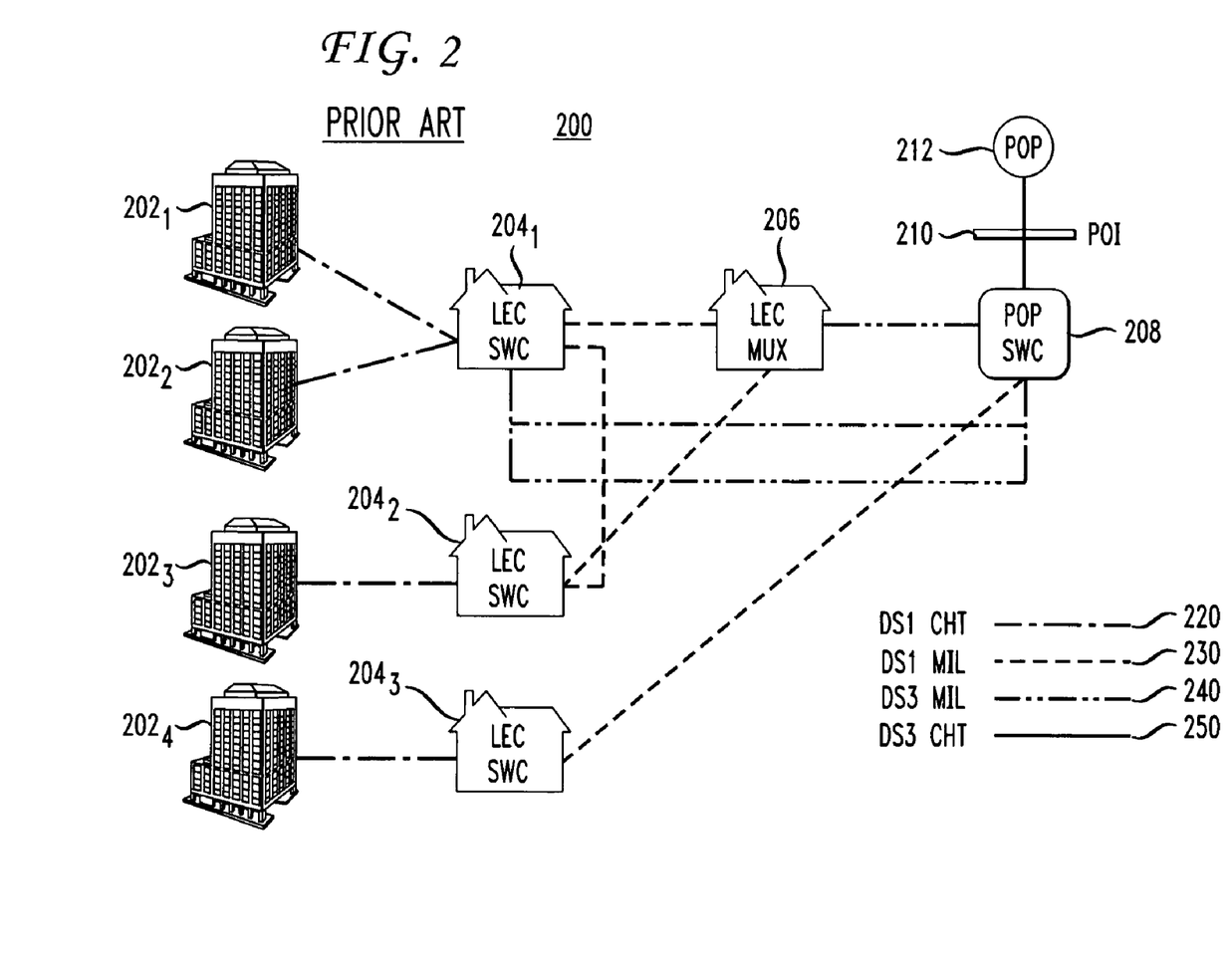
FIG. 2 is a schematic diagram of an illustrative dedicated access network topology prior to optimization.

FIG. 2 is a schematic diagram 200 of an exemplary dedicated access network topology. A plurality of customer locations, $202_1$, $202_2$, $202_3$ and $202_4$ are connected via DS1 Channel Termination (DS1 CHT) 220 to their respective Local Exchange Carrier Serving Wire Center (LEC SWC) $204_1$, $204_2$ and $204_3$. As is well known, the LECs provide local exchange telecommunications services, and the SWC is a physical location where the local exchange carrier terminates user/subscriber local connections. Additionally, SWCs can serve as an aggregation point on a LEC's network where transmission facilities and circuits are connected or switched, and where the provision of exchange services and access services is located.

LEC SWCs may be coupled to other devices via DS1 Multi-Stage Interleaving (DS1 MIL) 230 in three different ways: connected to another LEC SWC, as in the $204_1$-$204_2$ connection; coupled to a Local Exchange Center Multiplexer (LEC MUX) 206, represented by the $204_2$-206 connection, and coupled to a Point of Presence Serving Wire Center (POP SWC) 208, represented by the $204_3$-208 connection. DS1 MIL 230 and DS3 MIL 240 utilize multi-stage interleaving technology to increase performance by protecting the transmission against burst errors by interleaving some bits before being transmitted. A LEC MUX 206 is a multiplexer similar to the Channel Bank 104 of FIG. 1, which aggregates DS1 data rate signals to DS3 data rate signals. A POP SWC 208 is the physical location where a long distance carrier or a cellular provider interfaces with the network of the local exchange carrier. Additionally, LEC SWC $204_1$ and LEC MUX 206 are individually coupled directly to POP SWC 208 via DS3 Multi-Stage Interleaving (DS3 MIL) 240. POP SWC 208 is coupled through Point of Interface (POI) 210 to the Point of Presence (POP) 212 via DS3 Channel Termination (DS3 CHT) 250.

Figure 3:
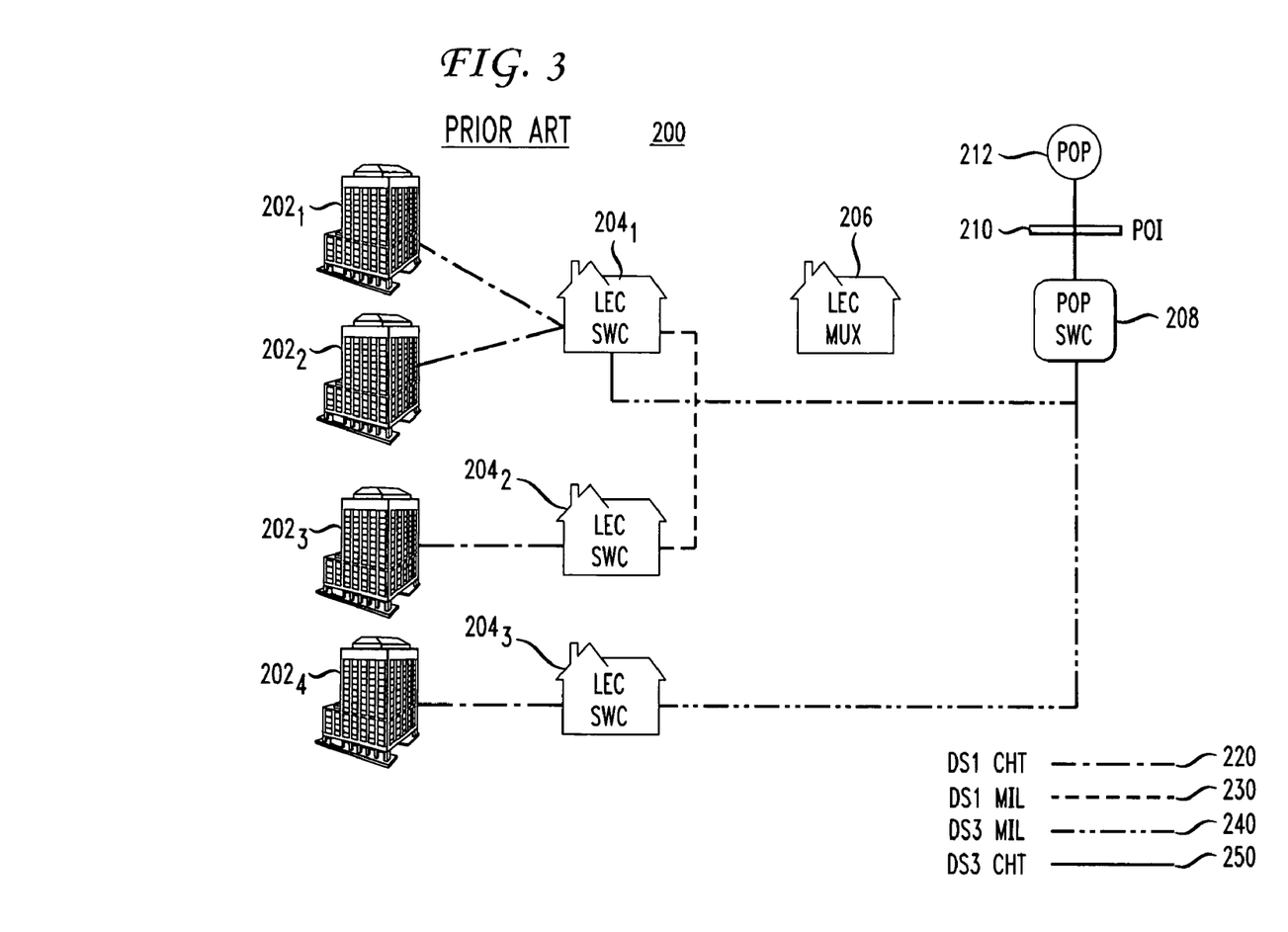
FIG. 3 is a schematic diagram of the sample dedicated access network of FIG. 2, that has been optimized through DS1 moves for partial mileage reduction, mileage elimination, and DS3 grooming, DS3 disconnects, DS3 adds to facilitate overall cost reduction, and muxing/hubbing location changes.

FIG. 3 is a schematic diagram 300 of an optimized dedicated access network that utilizes DS1 moves for partial mileage reduction, DS1 moves for mileage elimination, DS1 moves for DS3 grooming, DS3 disconnects, DS3 adds to facilitate overall cost reduction, and muxing/hubbing changes. For clarity, the same reference numerals have been retained from FIG. 2. In the illustrative optimization depicted in FIG. 3, the following changes have been made to the network 200 of FIG. 2.

DS1 MIL 230 has been moved for partial mileage reduction and elimination. This is implemented by removing the coupling between LEC SWC $204_1$ and LEC MUX 206, removing the coupling between LEC SWC $204_2$ and LEC MUX 206 and removing the coupling between LEC SWC $204_3$ and POP SWC 208, thereby removing LEC MUX 206 completely from the network in a multiplexing/hubbing location change whereby the functionality of the LEC MUC 206 is transferred to the LEC SWC $204_1$.

DS1 MIL 230 has been moved for DS3 MIL 240 grooming. This is implemented by removing the coupling between LEC SWC $204_2$ and LEC MUX 206, and instead routing the traffic from LEC SWC $204_2$ to LEC SWC $204_1$, for communication via a DS3 MIL 240 coupling to POP SWC 208.

Some DS3 MIL 240 lines have been disconnected. This is implemented by removing the redundant DS3 MIL 240 coupling between LEC SWC $204_1$ and POP SWC 208, and removing the coupling between LEC MUX 206 and POP SWC 208.

Some DS3 MIL 230 lines have been added. This is implemented by replacing the DS1 MIL 230 coupling with a DS3 MIL 240 coupling.

Figure 4:
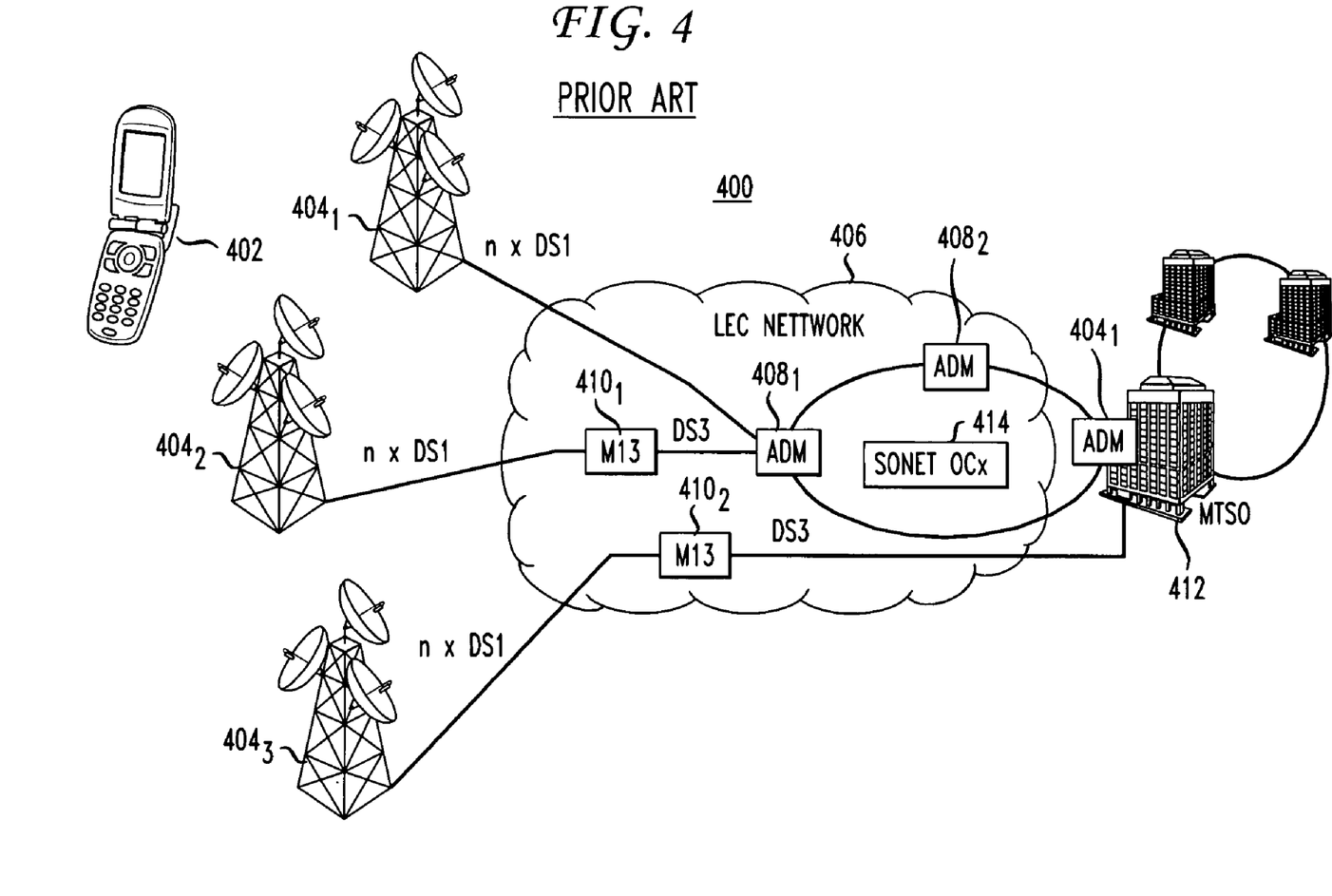
FIG. 4 is a schematic diagram of an exemplary mobility transport network topology.

FIG. 4 is a schematic block diagram 400 of an exemplary mobility transport network topology. A transport network is the portion of the carrier's radio access network situated between wireless cell site groups $404_1$, $404_2$ and $404_3$ and a Mobile Telecommunications Switching Office (MTSO) 412. The MTSO 412 is used for originating and terminating functions for calls to or from end users/subscribers of the service carrier. Signals travel to and from users of the radio access network using a network access device such as a cellular phone, PDA or other like apparatus shown generally at 402. Signals from the phone 402 are received by a cell site in groups $404_1$, $404_2$ and $404_3$ within the range of the phone. N×DS1 connections couple the cell towers to an Incumbent Local Exchange Carrier (ILEC) network 406. Multiple DS1 channels may directly couple to an Add/Drop Multiplexer (ADM) $408_1$ or be aggregated by a M13 multiplexer $410_1$, $410_2$, which then communicate via a DS3 signal to the ADM $408_1$ or directly to the MTSO 412. The ADM $408_1$ may communicate with the MTSO 412 via a Synchronous Optical Network (SONET) 414 over optical cable with a data rate as determined by standards such as OC-1, OC-3 and the like. As is well known, OC-1 has a base data rate of 51.84 Mbits/second, while OC-3 has a data rate of 155.52 Mbits/second. Transport costs are the single largest component in the mobility transport network, including those associated with leased DS1 or DS3 lines to connect cell sites to cell site serving wire centers, leased DS3 facilities to transport DS1 traffic between wire centers, and leased OC-x SONET rings to transport DS3 traffic between wire centers.

Figure 5:
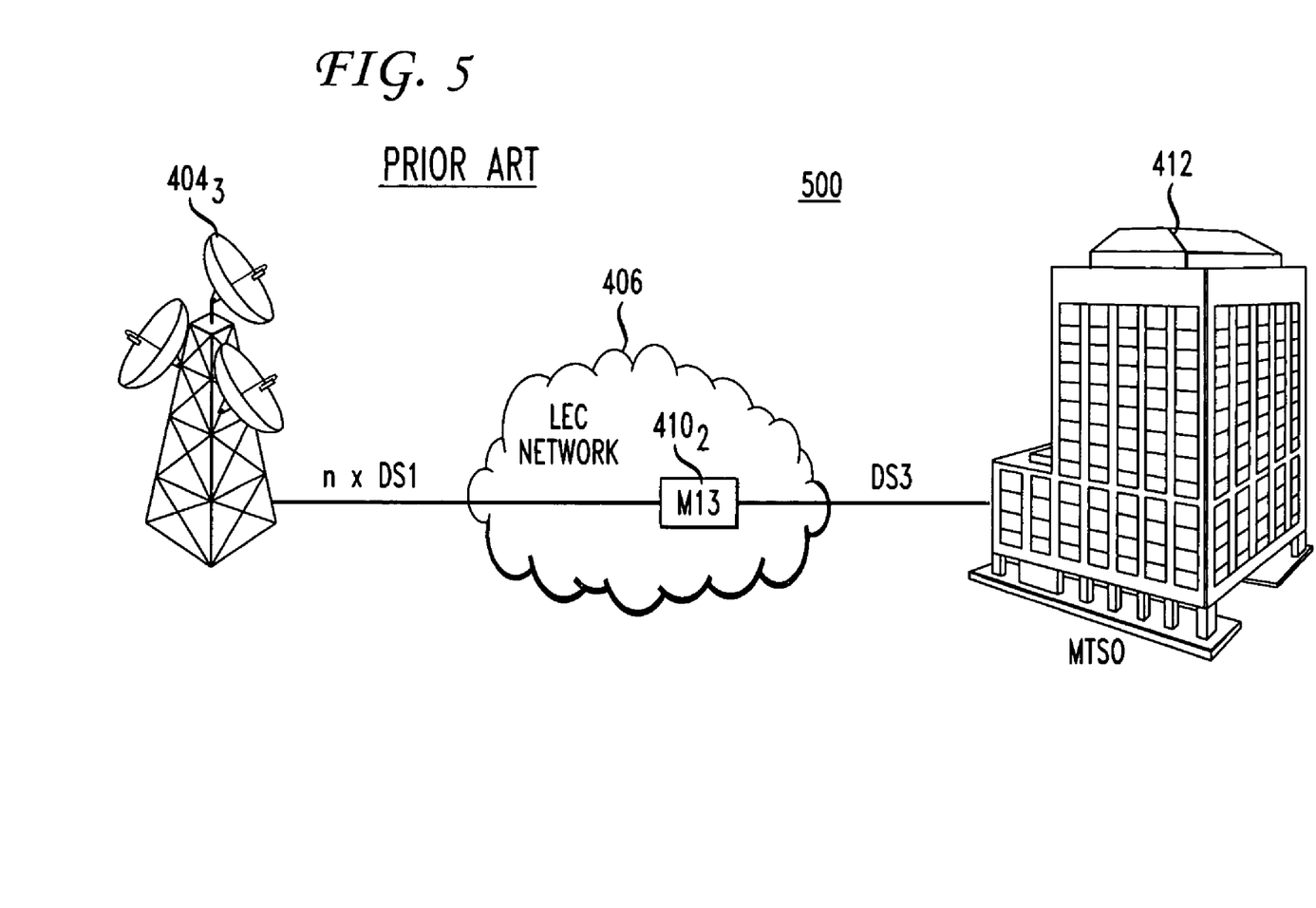
FIG. 5 is a schematic diagram of an exemplary "tailroll" for optimizing the mobility transport network of FIG. 4.

FIG. 5 is a schematic block diagram 500 of a first mobility transport network optimization known as a "Tailroll". The Tailroll involves moving the entire length of circuits from an ILEC not owned/controlled by the carrier to a carrier network or a carrier owned/controlled LEC (CLEC). In FIG. 5, cell tower(s) 404 are shown coupled via n×DS1 connections to a M13 multiplexer 410 within the carrier/CLEC network. The M13 multiplexer 410 communicates via DS3 to the MTSO 412. The Tailroll confers the advantage of saving circuit costs that were paid previously to another LEC, as well as the potential for improved reliability. Users/subscribers are not required to approve such a change, as it can simply be done at the carrier's discretion.

Figure 6:
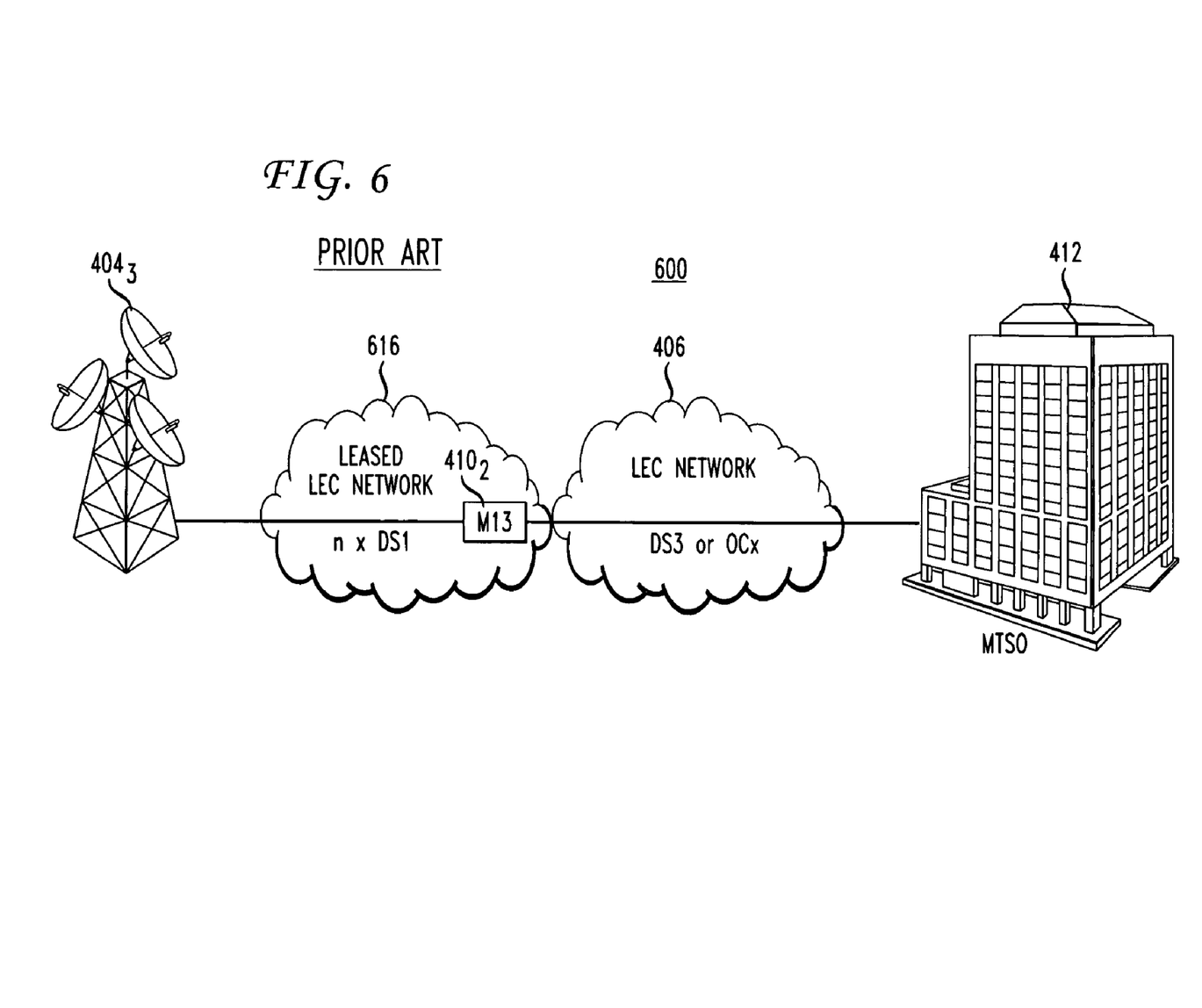
FIG. 6 is a schematic diagram of an exemplary "LSO to MTSO roll" for optimizing the mobility transport network of FIG. 4.

FIG. 6 is a schematic diagram 600 of another alternative mobility transport network optimization known as a "LSO to MTSO roll," where a portion of the leased circuits between the local serving office (LSO) and the MTSO are moved to the carrier's or LCEC network facilities. In FIG. 6, cell site(s) 404 are coupled via n×DS1 connections to a M13 multiplexer 410 through leased ILEC/CO network 616. The aggregated signals from the M13 multiplexer 410 are then sent via a DS3 signal or an OCx connection over a SONET to the MTSO 412 via the carrier or CLEC network 406. The advantages of the LSO to MTSO roll include savings by only leasing some portion of the connection mileage vs. leasing the entire connection. In such an optimization, M13 multiplexer(s) 410 may still need to be leased from an ILEC/ICO, or may be owned by the carrier. Connectivity from the MTSO 412 is still maintained to the POP SWC node from the carrier/CLEC.

Figure 7:
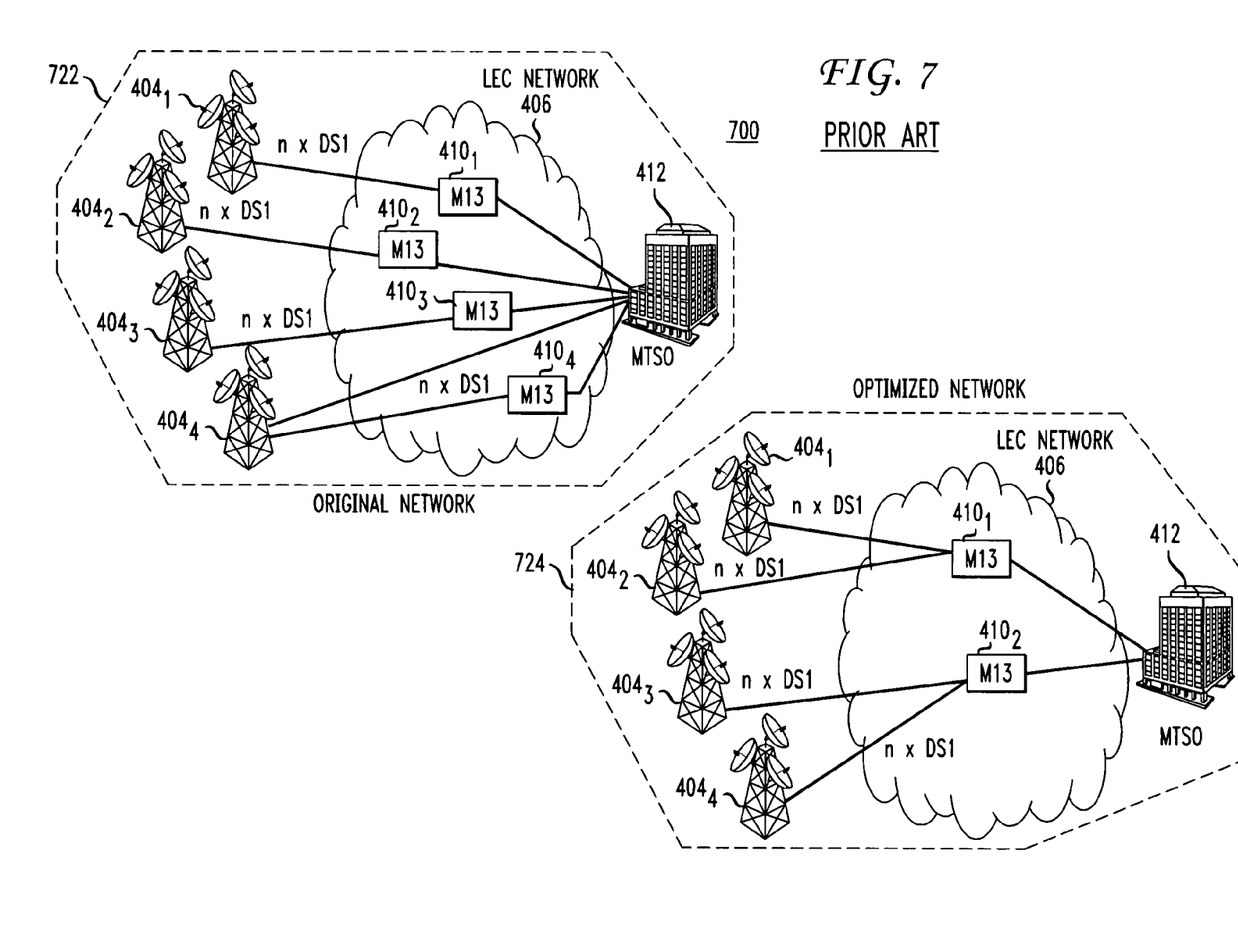
FIG. 7 is a schematic diagram of an exemplary "LSO to MTSO optimization" for optimizing the mobility transport network of FIG. 4.

FIG. 7 is a schematic diagram 700 of another exemplary mobility transport network optimization known as a "LSO to MTSO optimization," where a circuit that is entirely leased from the ILEC is optimized. The original network 722 is optimized into network 724 by hubbing DS1s to DS3s and grooming DS3s to improve DS3 utilization and eliminate spare DS3s. In the original network 722, multiple cell sites $404_1$, $404_2$, $404_3$ and $404_4$ are coupled over n×DS1 links to M13 multiplexers $410_1$, $410_2$, $410_3$ and $410_4$, or directly to the MTSO 412, via the ILEC Network 406. The optimized network 724 has cell sites $404_1$, $404_2$, $404_3$ and $404_4$ connected via moved DS1 connections to newly located M13 multiplexers $410_1$ and $410_2$, which then directly communicate via DS3 with the MTSO 412. This technique reduces DS1 Inter-Office Transport (IOT) by placing M13 multiplexer 410 hubs as early as possible into the transport topology. Existing or new M13 multiplexers 410 may be added as needed. Additionally, it will be appreciated by those skilled in the art that improved leased transport technology substitutions may be employed, such as for example, carrier grade Ethernet, with the goal of reducing costs while improving performance and reliability.

In accordance with aspects of the present invention, a joint dedicated access/RAN optimization is converted into a mathematical model as a constrained optimization problem, having the objective to minimize a carrier's overall costs. Various options for implementing network changes such as those described in the examples above, including but not limited to, changing circuit suppliers, choosing alternative leasing options, access traffic aggregation, alternative technologies, and new infrastructure technology, may be studied by exploiting the synergies between the dedicated access network and the radio access network wherever possible. A given set of business planning parameters can be utilized, including but not limited to, overall capital spending, overall operation resources, carrier throughput limits, planning horizon and the like.

Figure 8:
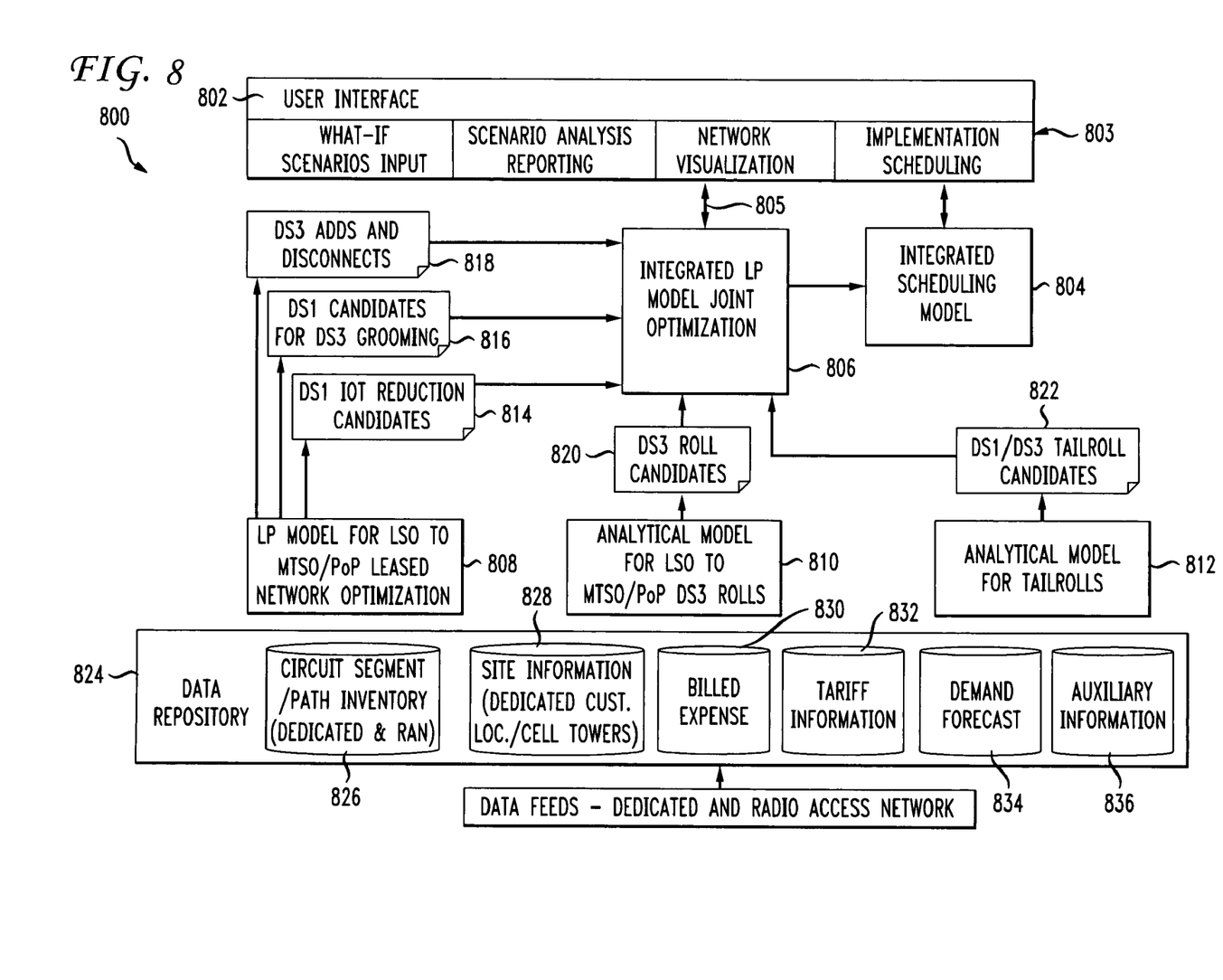
FIG. 8 is a high-level schematic of a system architecture for joint dedicated and radio access network planning/optimization, in accordance with an aspect of the present invention.

This optimization can be implemented by a computer program running in an appropriate computing environment. FIG. 8 is a high level framework 800 for the present invention. The framework 800 is shown in the exemplary embodiment as being deployed on a network-enabled architecture that is accessed using a graphical user interface (GUI) 802 on a client's network access device 803. The application code for implementing the optimization resides on an application server 804 or a plurality of application servers, and is accessed by users via a client application Web browser such as Mozilla Firefox, Netscape, Microsoft Internet Explorer and others, or via another client access software application that is not a general-purpose browser. This access may take place over a distributed transaction system using custom or standard Internet languages and protocols, and may involve scripting languages including Hypertext Markup Language (HTML), dynamic HTML (DHTML), Microsoft VBScript (Visual Basic Scripting Edition), Jscript, ActiveX, XML and Java.

A user's client application contacts the server 804 that implements the optimization and the server 804 sends information to a client application running on the client's network access device 803 for displaying the results to the user. The arrangement may provide for an on-line analytical processing (OLAP) tool for enabling the user to drill-down into results that are output by the optimization program in a manner that is known to those skilled in the art. OLAP software may reside modules residing on the server 804 and the client's network access device 803.

In the exemplary embodiment, the user inputs a given set of network business planning parameters through "what-if-scenarios" for network optimization indicated at block 805 via the GUI 802. The business planning parameters may include, but are not limited to, overall capital spending for the carrier, overall operation resources, throughput limits, planning horizons and the like.

The business planning parameters are input to an integrated linear programming (LP) model 806 for joint optimization (LP joint optimization model) that determines the optimal network configuration changes taking into account a plurality of individual network optimization models that are shown illustratively as an LP model for LSO to MTSO/PoP leased network optimization 808, analytical model for LSO to MTSO/PoP DS3 rolls 810, and an analytical model for Tailrolls 812. These types of network optimizations are described above. The leased network optimization model 808 identifies DS1 IOT reduction candidates 814, DS1 candidates for DS3 grooming 816, and DS3 adds and disconnects 818. The LSO to MTSO/PoP roll model 810 outputs DS3 roll candidates 820, and the Tailroll model 812 outputs DS1/DS3 tailroll candidates 822. The outputs from the individual models 808, 810 and 812 are input to the integrated LP model 806. Information for executing the various models is incorporated in a plurality of databases 824, including a circuit segment/path inventory database 826 for both dedicated and radio access networks, a site information database 828 for both dedicated customer locations and cell sites, a billed expense database 830, tariff database 832, demand forecast database 834, and auxiliary information database 836. These databases may be collocated with server 804 or may reside somewhere else on a communications network and can be accessed in a conventional fashion.

In implementing the joint optimization in accordance with an aspect of the invention, a mathematical formulation starts by describing the following indices:

Let i be the index of access circuits, i=1 . . . I;
Let m be the index of optimization models, m=1 . . . M;
Let g be the index for bundle groups, g=1 . . . G;
Let t be the index of time period (month), t=1 . . . T;
Let v be the index of access vendors, v=1 . . . V;
Let ct be the index of circuit types (DS1, DS3, OC3, etc), ct=1 . . . CT;
Let mt be the index of migration types (rehoming circuits between POP and LSO, roll circuits to carrier's own fiber ring in customer buildings, roll circuits to LEC fiber ring in customer buildings, etc), mt=1 . . . MT.

With the above indices defined, initialized and bounded, the following variables are defined:

The average monthly saving per circuit for a bundle group can be denoted as avg_save(g) (>0);

The circuit type for circuit i is noted as ckttype(i,ct), where ckttype(i,ct)=1 if circuit i is of type ct, it is 0 otherwise (a circuit can be only one type);

The bundle group for circuit i is noted as cktgrp(i,g), where cktgrp(i,g)=1 if circuit i belongs to group g, it is 0 otherwise (note that a circuit can belong to one or more groups);

The optimization model to bundle group association is noted as mgrp(m,g), where mgrp(m,g)=1 if group g belongs to model m, it is 0 otherwise (a group can belong to only one model);

The migration type to bundle group association is noted as miggrp(mt,g), where miggrp(mt,g)=1 if migration type for circuits in group g is mt, it is 0 otherwise;

The access vendor to bundle group association is noted as vdrgrp(v,g), where vdrgrp(v,g)=1 if circuits in group g are provided by vendor v, it is 0 otherwise;

The throughput limit per time period (month) for vendor v, migration type mt and circuit type ct can be noted as vdrthrput (v,mt,ct);

The carrier's own throughput limit per time period (month) for migration type mt and circuit type ct can be noted as cthrput(mt,ct);

The fixed capital cost can be noted as fix_cap(g) for group g;

The variable capital cost can be noted as var_cap(g) for group g;

The operation cost can be noted as opex(g) for group g;

The monthly recurring cost can be noted as recur_cost(g) for group g;

The payback period (in years) can be noted as pbyr(g) for group g;

The delay in time periods from start of circuit migration to first month saving realization can be noted as dly(g) for group g;

The maximum capital resource is denoted as mcap;

The maximum operation cost resource is denoted as mopex;

The annual capital burden rate is denoted as capex_burden;

The depreciation period (in years) is denoted as dep_year;

The model selection indicator is denoted as msel(m) (it is 1 if model m is selected for a given scenario, it is 0 otherwise);

The customer take rate for bundle group output associated with model m with a payback period ay years is denoted as take_rate (m,ay);

The ramp up schedule is denoted as ramp(mt,ct,t) for migration type mt, circuit type ct at time period t ($0 \leq$ ramp $(mt,ct,t) \leq 1$).

The following binary variables are now defined:

Let x(i,g,t) be the binary variable that indicates if migration starts at time t for circuit i in bundle group g (it takes value 1 when this is true, otherwise it is 0);

Let z(g) be the binary variable that indicates if bundle group g should be selected in the optimized solution (it is 1 if selected, it is 0 otherwise);

Let y(g,t) be the binary variable that indicates if migration has started for any circuit in group g by time period t (it is 1 if this is true, it is 0 otherwise, note that $y(g,t1) \leq y(g,t2)$ $\forall t1 < t2$, $1 \leq t1 \leq T$, $1 \leq t2 \leq T$).

The following dependent variables are now defined:

$$xd(c,g,t)=x(c,g,t-dly(g)) \text{ where } 1+dly(g) \leq t \leq T+dly(g);$$

$$w(g) = \sum_{t=1}^{T} y(g,t).$$

The goal is to find optimal solution for x(i,g,t) and z(g) that maximize the total saving S over an analysis period of T months:

$$S = \sum_{m=1}^{M} \sum_{g=1}^{G} (\text{avg\_save}(g) \cdot \text{take\_rate}(m, \text{pbyr}(g)) \cdot \left( \sum_{i=1}^{I} \sum_{t=1+dly(g)}^{T} \sum_{tv=1+dly(g)}^{t} xd(i, g, tv) \cdot \text{cktgrp}(i, g) \right) - z(g) \cdot \text{opex}(g) - z(g) \cdot (\text{fix\_cap}(g) + \text{var\_cap}(g) \cdot \sqrt{\text{take\_rate}(m, \text{pbyr}(g))}) \cdot \text{capex\_burden} - (\text{fix\_cap}(g) + \text{var\_cap}(g) \cdot \sqrt{\text{take\_rate}(m, \text{pbyr}(g))}) / (\text{dep\_year} \cdot 12) \cdot \max(w(g), \text{dep\_year} \cdot 12) - \text{recur\_cost}(g) \cdot w(g)) \cdot \text{mgrp}(m, g)$$

The following constraints apply to the optimization problem:

A circuit can be scheduled to start its migration at most in one time period across all bundle groups it belongs to:

$$\sum_{g=1}^{G} \sum_{t=1}^{T} x(i, g, t) \leq 1 \quad \forall i \in (1 \ldots I);$$

When a bundle group is selected (z(g)=1), all circuits that belong to this group must all be selected. Similarly, when a group is not selected (z(g)=0), then all associated circuits must not be selected:

$$\sum_{t=1}^{T} x(i, g, t) \cdot \text{cktgrp}(i, g) = z(g) \quad \forall i \in (1 \ldots I), g \in (1 \ldots G)$$

Variable y(g,t) can be derived from variable x(i,g,t) by the following relationships:

$$y(g, t) \leq \sum_{i=1}^{I} \sum_{tv=1}^{t} x(i, g, tv) \cdot \text{cktgrp}(i, g) \forall g \in (1 \ldots G), t \in (1 \ldots T);$$

$$y(g, t) \geq \sum_{tv=1}^{t} x(i, g, tv) \quad \forall i \in (1 \ldots I), g \in (1 \ldots G), t \in (1 \ldots T);$$

All bundle groups with payback period longer than analysis period T (months) should not be selected: z(g)=0 if pbyr(g)>(T/12);

When a model is not selected, then all bundle groups from this model must not be selected: msel(m)≧z(g) for m ∈ (1 ... M), g ∈ (1 ... G) where mgrp(m,g)=1

The total capital spending is limited to mcap:

$$\sum_{m=1}^{M} \sum_{g=1}^{G} z(g) \cdot \left( \frac{\text{fix\_cap}(g) + \text{var\_cap}(g) \cdot}{\sqrt{\text{take\_rate}(m, \text{pbyr}(g))}} \right) \cdot \text{mgrp}(m, g) \leq \text{mcap}$$

The total operation cost is limited to mopex:

$$\sum_{g=1}^{G} z(g) \cdot \text{opex}(g) \leq \text{mopex}$$

A vendor throughput limits must be satisfied:

$$\sum_{i=1}^{I} \sum_{g=1}^{G} \sum_{m=1}^{M} \text{cktgrp}(i, g) \cdot x(i, g, t) \cdot \text{take\_rate}(m, \text{pbyr}(g)) \cdot \text{ckttype}(i, ct) \cdot \text{vdgrp}(v, g) \cdot \text{miggrp}(mt, g) \cdot \text{mgrp}(m, g) \leq \text{vdrthrput}(v, mt, ct) \cdot \forall t \in (1 \ldots T), v \in (1 \ldots V), mt \in (1 \ldots MT), ct \in (1 \ldots CT)$$

The carrier's own throughput limits must be satisfied:

$$\sum_{i=1}^{I} \sum_{g=1}^{G} \sum_{m=1}^{M} \text{cktgrp}(i, g) \cdot x(i, g, t) \cdot \text{take\_rate}(m, \text{pbyr}(g)) \cdot \text{ckttype}(i, ct) \cdot \text{miggrp}(mt, g) \cdot \text{mgrp}(m, g) \leq \text{cthrput}(mt, ct) \cdot \text{ramp}(mt, ct, t) \quad \forall t \in (1 \ldots T), mt \in (1 \ldots MT), ct \in (1 \ldots CT)$$

Note that the variable capital cost is a function of take rate parameter. In the above formulation for saving objective S, the variable capital cost is linearly proportional to square root of take rate. However, it could be replaced by any other function. Since the objective function and constraints are linear functions of variables x(i,g,t) and z(g), a standard linear programming solver (capable of handling integer programming problem) can be used to find the optimal solution.

The integrated LP model 806 outputs a scenario analysis report 838 and visualization 840 of the proposed network topology in accordance with the optimization via the GUI 802. The network visualization 840 generates a revised network topology that enables a network planner to easily see the planned network changes to implement the optimization to both the dedicated and radio access networks. From this, implementation and scheduling 842 of the network optimization may carried out by an integrated scheduling model 844 that cooperates with the integrated joint LP optimization model 806.

Figure 9:
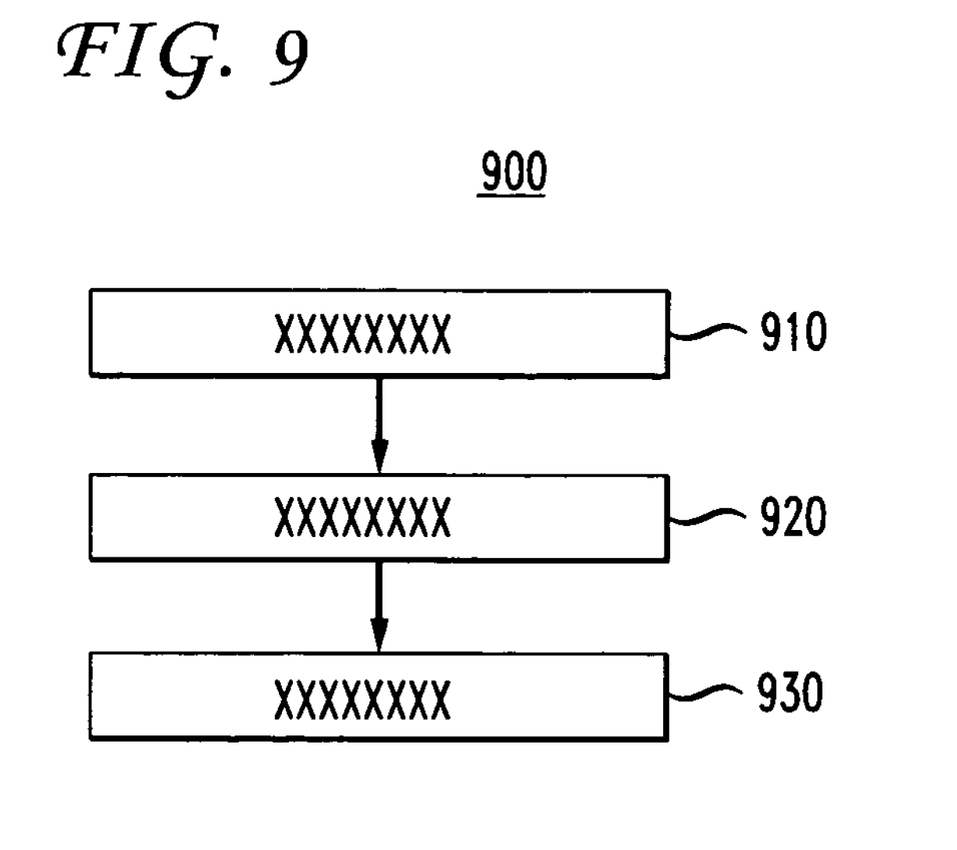
FIG. 9 is an exemplary method in accordance with an aspect of the present invention.

In accordance with the above, an aspect of the invention provides a computerized method for integrated access network business planning for a telecommunications carrier. In step 900, a user inputs a plurality of network business planning parameters via a graphical user interface on a client computer. At step 902, these parameters are received by a server and input to an integrated LP joint optimization model. At step 904, the LP joint optimization model receives the respective outputs of a plurality of individual models (i.e., models 808, 810 and 812 shown in FIG. 8). At step 906, the LP joint optimization model then jointly determines network configuration changes for the optimized dedicated and radio access networks based on the set of business planning parameters that were input in step 900. At step 908, the configuration changes and a visualization of the network topology are provided on the user's GUI.

Figure 10:
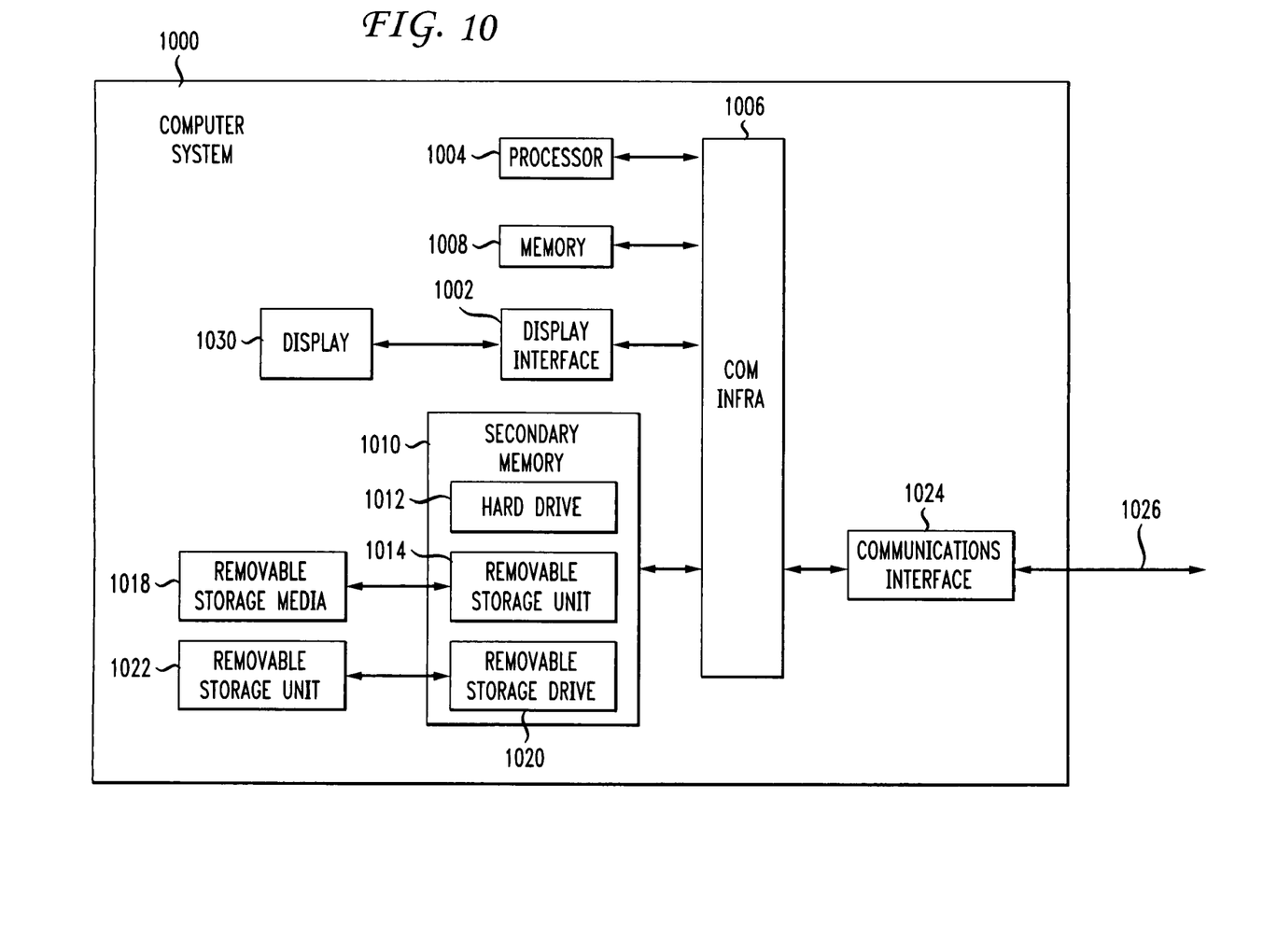
FIG. 10 is an exemplary computing device for implementing the present invention.

The present invention may be implemented using hardware, software or a combination thereof and may be implemented in one or more computer systems or other processing systems. An example of such a computer system 1000 is shown in FIG. 10. It will be appreciated by those skilled in the art that computer system 1000 may operate as a server that is networked to other computers 1000 to operate as a client/server system, such as described in the exemplary embodiment shown in FIG. 8, or computer 1000 may operate as a standalone system. Computer system 1000 includes one or more processors, such as processor 1004. Processor 1004 is connected to a communication infrastructure 1006 (e.g., a communications bus, cross-over bar, or network). Computer system 1000 can include a display interface 1002 (e.g. a graphics card) that allows graphics, text, and other data from the communication infrastructure 1006 (or from a frame buffer not shown) to be displayed on a display unit 1030. Computer system 1000 also includes a main memory 1008, preferably random access memory (RAM), and may also include a secondary memory 1010. The secondary memory 1010 may include, for example, a hard disk drive 1012 and/or a removable storage drive 1014. The removable storage drive 1014 has read/write functionality onto removable storage media 1018 having stored therein computer software and/or data. In alternative embodiments, secondary memory 1010 may include other similar devices for allowing computer programs or other instructions to be loaded into computer system 1000. Such devices may include, for example, a removable storage unit 1022 and an interface 1020. Examples of such may include a program cartridge and cartridge interface (such as that found in video game devices), a removable memory chip (such as an erasable programmable read only memory (EPROM), or programmable read only memory (PROM)) and associated socket, and other removable storage units 1022 and interfaces 1020, which allow software and data to be transferred from the removable storage unit 1022 to computer system 1000. Computer system 1000 may also include a communications interface 1024 allowing software and data to be transferred between computer system 1000 and external devices. Examples of communications interface 1024 may include a modem, a network interface (such as an Ethernet card), a communications port, a Personal Computer Memory Card International Association (PCMCIA) slot and card, etc. Software and data transferred via communications interface 1024 are in the form of signals (not shown), which may be electronic, electromagnetic, optical or other signals capable of being received by communications interface 1024. These signals are provided to communications interface 1024 via a communications path (e.g., channel) 1026. This path 1026 carries the signals and may be implemented using wire or cable, fiber optics, a telephone line, a cellular link, a radio frequency (RF) link and/or other communications channels. Computer programs (also referred to as computer control logic) are stored in main memory 1008 and/or secondary memory 1010. Computer programs may also be received via communications interface 1024. Computer programs, when executed, enable the computer system 1000 to perform the features of the present invention, as discussed herein. Accordingly, such computer programs represent controllers of the computer system 1000. In an embodiment where the invention is implemented using software, the software may be stored in a computer program product and loaded into computer system 1000 using removable storage drive 1014, hard drive 1012, or communications interface 1024. The control logic (software), when executed by the processor 1004, causes the processor 1004 to perform the functions of the invention as described herein. In another embodiment, the invention is implemented primarily in hardware using, for example, hardware components, such as application specific integrated circuits (ASICs). Implementation of the hardware state machine so as to perform the functions described herein will be apparent to persons skilled in the relevant art(s). In one exemplary embodiment, the system for the present invention may be implemented, for example, as a Microsoft.net® desktop application program (Microsoft.net® is made by Microsoft® Corporation of Redmond, Wash.), which may reside on a computer hard drive, database or other repository of data, or be uploaded from the Internet or other network (e.g., from a PC, minicomputer, mainframe computer, microcomputer, telephone device, PDA, or other NAD having a processor and input and/or output capability). Any available software tool capable of implementing the concepts described herein may be used to implement the system and method of the present invention. The method and system of the present invention may also be implemented as an application-specific add-on to a program, or as a standalone application.

Figure 11:
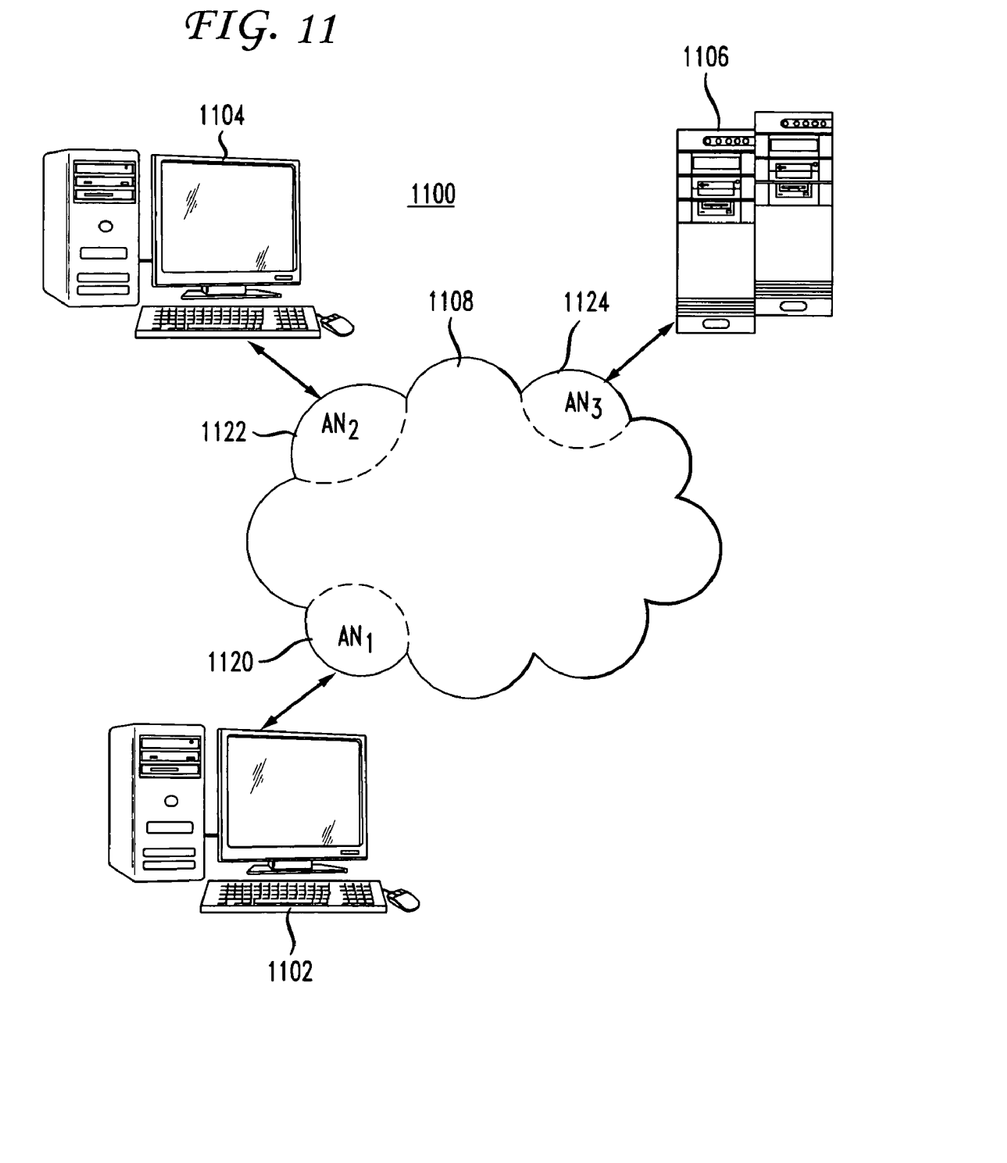
FIG. 11 is an exemplary network access device communicating with a network for implementing the present invention.

Referring to FIG. 11, there is depicted an embodiment of the present invention wherein a user can access a server implementing the optimization program running on a server via one or more client Network Access Devices (NADs) such as NAD 1102 and NAD 1104, among a plurality of NADs via, for example, a network 1110, such as the Internet or an intranet, and access networks (ANs) $AN_1$ 1120, $AN_2$ 1122 and $AN_3$ 1124. The ANs may include, for example, wired, wireless, or fiberoptic links. Examples of such NADs include a personal computer, laptop computer, minicomputer, mainframe computer, microcomputer, telephonic device, or wireless device, such as a hand-held wireless device. These NADs communicate over the communications network 1110 to a server 1106 (or network of server computers that implement the functionality of server 804 in FIG. 8). Each NAD has a GUI that is capable of enabling the user to input network optimization scenarios and to obtain reporting and visualization of optimized network changes in accordance with the protocols described above.

The foregoing detailed description is to be understood as being in every respect illustrative and exemplary, but not restrictive, and the scope of the invention disclosed herein is not to be determined from the description of the invention, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention.

We claim:

1. A method, comprising:
   executing, by a computing system including a processor, a linear programming joint optimization model based on a set of business planning parameters and determining a network configuration change for a dedicated network and a network configuration change for a radio access network with an objective of meeting a cost function related to a telecommunications carrier,
   wherein the executing of the linear programming joint optimization model is based on an index of access circuits, an index of optimization models, an index of bundle groups, an index of time periods, an index of access vendors, an index of circuit types, and an index of migration types.

2. The method of claim 1, further comprising enabling an input of the set of network business planning parameters through a graphical user interface.

3. The method of claim 1, further comprising:
   generating a first network topology of the network configuration change for the dedicated network and a second network topology of the network configuration change for the radio access network; and
   displaying the first network topology and the second network topology on a graphical user interface.

4. A system, comprising:
   a server that:
      executes a linear programming joint optimization model based on a set of business planning parameters; and
      determines a network configuration change for a dedicated network and a network configuration change for a radio access network with an objective of meeting a cost function related to a telecommunications carrier utilizing an index of access circuits, an index of optimization models, an index of bundle groups, an index of time periods, an index of access vendors, an index of circuit types, and an index of migration types.

5. The system of claim 4, further comprising a data store that stores information related to parameters of the linear programming joint optimization model.

6. The system of claim 4, further comprising a graphical user interface that facilitates an input of the set of network business planning parameters.

7. The system of claim 4, wherein the server executes a network visualization module that enables a topology display of the network configuration change for the radio access network and the network configuration change for the dedicated network on a graphical user interface.

8. The method of claim 1, further comprising accessing a data store that stores information related to parameters of the linear programming joint optimization model.

9. The method of claim 1, wherein the linear programming joint optimization model comprises a first linear programming optimization model and a second linear programming optimization model.

10. The method of claim 9, wherein the executing comprises executing the first linear programming optimization model and the second linear programming optimization model and finding an optimal solution for the first linear programming optimization model and the second linear program optimization model that minimizes a cost to the telecommunications carrier over an analysis period of time.

11. The system of claim 4, wherein the linear programming joint optimization model comprises a first linear programming optimization model and a second linear programming optimization model.

12. The system of claim 11, wherein the server is configured to execute the first linear programming optimization model and the second linear programming optimization model and find an optimal solution for the first linear programming optimization model and the second linear program optimization model that minimizes a total cost savings over an analysis period of time.

13. The system of claim 4, wherein the linear programming joint optimization model is based on an index of access circuits.

14. The system of claim 4, wherein the linear programming joint optimization model is based on an index of bundle groups.

15. The system of claim 4, wherein the linear programming joint optimization model is based on an index of access vendors.

16. The system of claim 4, wherein the linear programming joint optimization model is based on an index of migration types.

17. The system of claim 4, wherein the linear programming joint optimization model is based on an index of circuit types.

18. The system of claim 4, wherein the linear programming joint optimization model is based on an index of time periods.

19. A non-transitory computer-readable storage medium having instructions stored thereon that, in response to execution, cause a computing device to perform operations, comprising:
   executing a linear programming joint optimization model based on a set of business planning parameters; and
   determining a network configuration change for a dedicated network and a network configuration change for a radio access network with an objective of meeting a cost function related to a telecommunications carrier utilizing an index of access circuits, an index of optimization models, an index of bundle groups, an index of time periods, an index of access vendors, an index of circuit types, and an index of migration types.

20. The non-transitory computer-readable storage medium of claim 19, wherein the operations further comprise:
   executing a first linear programming optimization model and a second linear programming optimization model and finding an optimal solution for the first linear programming optimization model and the second linear program optimization model that minimizes a cost to the telecommunications carrier over an analysis period of time.

* * * * *